(12) United States Patent
Braunshtein et al.

(10) Patent No.: US 12,386,615 B2
(45) Date of Patent: Aug. 12, 2025

(54) EXECUTING A CONTINUOUS INTEGRATION PIPELINE BASED ON A TYPE OF CHANGE TO SOURCE CODE

(71) Applicant: RED HAT, INC., Raleigh, NC (US)

(72) Inventors: Ori Braunshtein, Lehavim (IL); Michael Gourin, Jerusalem (IL)

(73) Assignee: Red Hat, Inc., Raleigh, NC (US)

( * ) Notice: Subject to any disclaimer, the term of this patent is extended or adjusted under 35 U.S.C. 154(b) by 217 days.

(21) Appl. No.: 18/084,962

(22) Filed: Dec. 20, 2022

(65) Prior Publication Data

US 2024/0201985 A1 Jun. 20, 2024

(51) Int. Cl.
G06F 8/77 (2018.01)
G06F 8/30 (2018.01)
G06F 11/3604 (2025.01)

(52) U.S. Cl.
CPC .............. *G06F 8/77* (2013.01); *G06F 8/30* (2013.01); *G06F 11/3616* (2013.01)

(58) Field of Classification Search
CPC ........................................................ G06F 8/77
USPC ......................................................... 717/101
See application file for complete search history.

(56) References Cited

U.S. PATENT DOCUMENTS

| | | | |
|---|---|---|---|
| 7,614,046 B2 | 11/2009 | Daniels et al. | |
| 9,262,193 B2 | 2/2016 | Hicks et al. | |
| 9,880,832 B2 | 1/2018 | Plate et al. | |
| 10,817,275 B2 | 10/2020 | Eroshkina et al. | |
| 10,817,283 B1* | 10/2020 | Naik | G06F 11/3612 |
| 11,113,185 B2* | 9/2021 | Sandhu | G06F 8/71 |
| 11,194,566 B1 | 12/2021 | Gabrielson | |
| 11,238,138 B1* | 2/2022 | Ancheta | H04L 9/0891 |
| 11,392,360 B2* | 7/2022 | Plewa | G06F 8/71 |
| 11,422,795 B2* | 8/2022 | Reddy | G06N 20/00 |
| 11,550,567 B2* | 1/2023 | Copty | G06F 11/3079 |
| 11,556,650 B2* | 1/2023 | Frost | G06N 5/02 |
| 11,573,787 B1* | 2/2023 | Hashimi | G06F 8/42 |
| 11,586,433 B2* | 2/2023 | Hoenzsch | G06F 11/3672 |
| 11,726,782 B2* | 8/2023 | Olejarz | G06F 8/77 717/101 |
| 11,816,470 B2* | 11/2023 | Schumaker | G06F 8/60 |
| 11,836,485 B1* | 12/2023 | Cancilla | G06F 8/75 |
| 11,874,762 B2* | 1/2024 | Nidugala | G06F 11/3688 |
| 2007/0256068 A1 | 11/2007 | Barr et al. | |

(Continued)

FOREIGN PATENT DOCUMENTS

| | | | |
|---|---|---|---|
| CN | 114237701 A | * | 3/2022 |
| JP | 2024075116 A | * | 6/2024 |
| WO | 2019106465 A1 | | 6/2019 |

*Primary Examiner* — Francisco J Aponte
(74) *Attorney, Agent, or Firm* — Kilpatrick Townsend & Stockton LLP

(57) ABSTRACT

A continuous integration (CI) pipeline can be executed based on a type of content for a change to source code. For example, a computing system can receive the change to the source code of a software application in response to a request for changing the source code being generated. The computing system can identify the type of content included in the change to the source code. Specifically, the computing system can determine whether the type of content is associated with a prevention of an execution of the CI pipeline. In response, the computing system can perform an action associated with the change to the source code prior to a deployment of the change to the source code.

20 Claims, 3 Drawing Sheets

(56) References Cited

U.S. PATENT DOCUMENTS

| | | | | |
|---|---|---|---|---|
| 2015/0100940 | A1* | 4/2015 | Mockus | G06F 8/70 |
| | | | | 717/101 |
| 2017/0235661 | A1* | 8/2017 | Liu | G06F 8/443 |
| | | | | 717/106 |
| 2019/0026107 | A1* | 1/2019 | Kashiwagi | G06F 11/3604 |
| 2019/0065355 | A1* | 2/2019 | Yamamoto | G06F 8/71 |
| 2019/0294531 | A1* | 9/2019 | Avisror | G06F 11/3692 |
| 2020/0004519 | A1* | 1/2020 | Ryall | G06F 8/71 |
| 2020/0133661 | A1* | 4/2020 | Alexander | G06F 11/3684 |
| 2020/0341752 | A1* | 10/2020 | Lim | G06F 8/75 |
| 2020/0401397 | A1* | 12/2020 | Thomas | G06F 11/327 |
| 2021/0019249 | A1* | 1/2021 | Gnaneswaran | G06N 20/20 |
| 2021/0103512 | A1* | 4/2021 | Peterson | G06F 11/3692 |
| 2021/0149666 | A1* | 5/2021 | Goern | G06F 8/71 |
| 2021/0349814 | A1* | 11/2021 | Joshi | G06F 11/3688 |
| 2022/0027148 | A1* | 1/2022 | Woolley | G06F 11/3608 |
| 2022/0129564 | A1* | 4/2022 | Hecht | G06F 21/53 |
| 2022/0269500 | A1 | 8/2022 | Graham et al. | |
| 2022/0318002 | A1* | 10/2022 | Copty | G06F 11/3079 |
| 2022/0342664 | A1* | 10/2022 | Fujita | G06F 11/3604 |
| 2022/0398188 | A1* | 12/2022 | Leasck | G06F 9/451 |
| 2023/0086361 | A1* | 3/2023 | Wan | G06F 8/77 |
| | | | | 702/186 |
| 2023/0315399 | A1* | 10/2023 | Gupta | G06F 8/31 |
| 2024/0078172 | A1* | 3/2024 | Duggal | G06F 11/3696 |
| 2024/0086190 | A1* | 3/2024 | Kwatra | H04L 63/20 |
| 2024/0119156 | A1* | 4/2024 | Stewart | G06F 8/77 |
| 2024/0192974 | A1* | 6/2024 | Gadupudi | G06F 11/362 |

\* cited by examiner

EXECUTING A CONTINUOUS INTEGRATION PIPELINE BASED ON A TYPE OF CHANGE TO SOURCE CODE

TECHNICAL FIELD

The present disclosure relates generally to continuous integration during software development. More specifically, but not by way of limitation, this disclosure relates to executing a continuous integration (CI) pipeline based on a type of change to source code.

BACKGROUND

Continuous integration is the process of merging developers' working copies of source code into a shared mainline code-base at frequent intervals, such as multiple times a day. Continuous integration can be implemented using continuous integration tools, such as Jenkins, Buildbot, GitHub Actions, or Travis CI. Developers can submit source code at periodic intervals to the continuous integration tool, which can implement a continuous integration pipeline that attempts to produce a build from the source code. A build is executable code that has been successfully created and tested for a piece of software, such as a software application. Generally, the continuous integration pipeline includes multiple phases that are executed in a sequential order. The continuous integration pipeline can begin with a compilation phase in which the source code is compiled into artifacts. Artifacts are executable code that has been compiled from source code for testing. The continuous integration pipeline can then perform a testing phase in which various types of tests (e.g., integration tests, acceptance tests, and unit tests) are executed on the artifacts. The testing phase can enable the developers to rapidly detect defects in the source code, so that they can be corrected as soon as possible.

DETAILED DESCRIPTION

Figure 1:
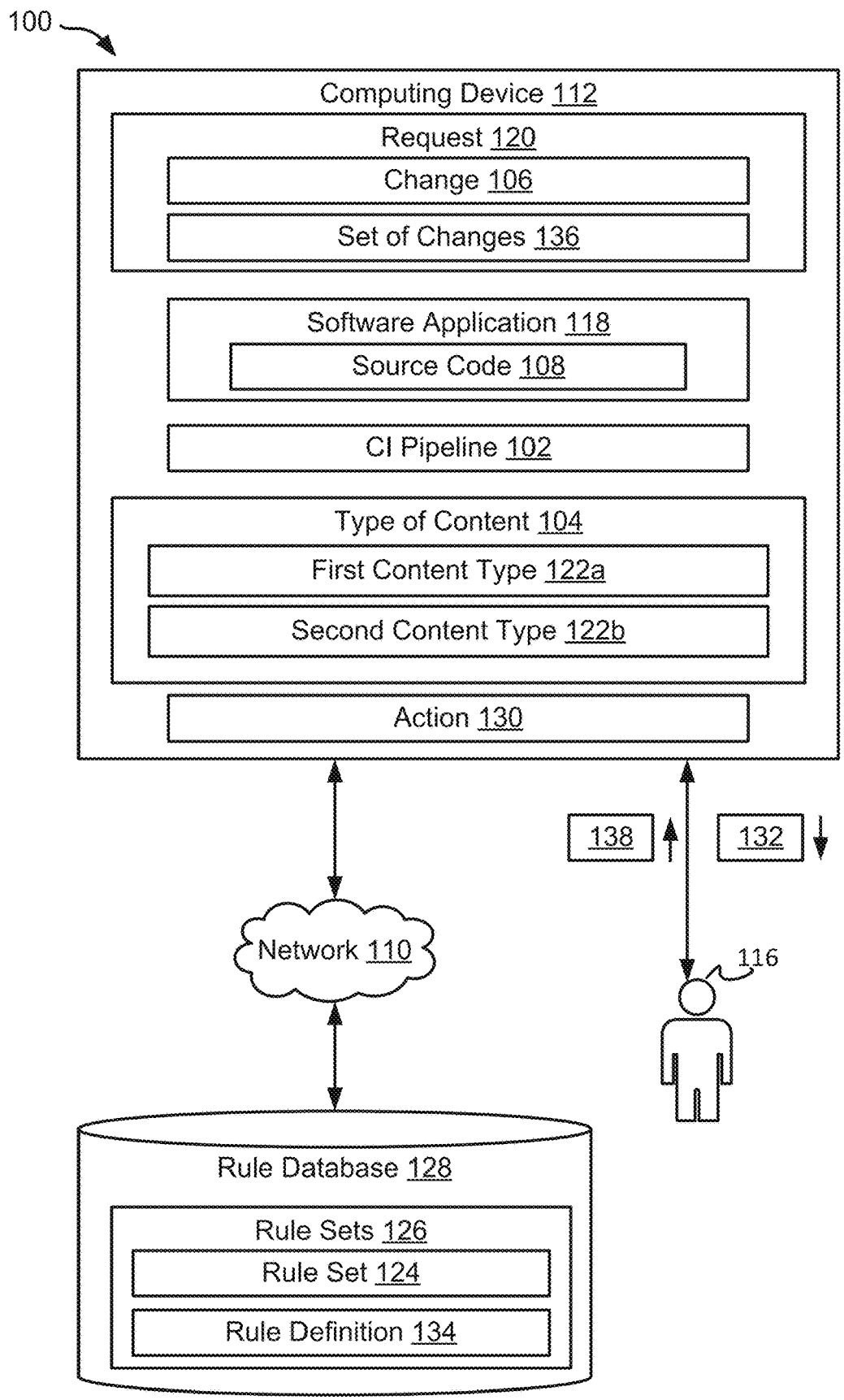
FIG. 1 is a block diagram of an example of a computing environment for executing a continuous integration pipeline based on a type of content for a change to source code according to one example of the present disclosure.

A continuous integration (CI) pipeline can facilitate building or deploying source code for a software application by automating steps in a software development process. After a developer submits changes to the source code, the CI pipeline can be executed to determine suitability of the changes to the source code for deployment. For example, the developer can use the CI pipeline to ensure that the changes to the source code are unlikely to negatively affect existing code in the source code. However, running the CI pipeline can be resource-intensive or time-consuming. In some examples, the CI pipeline may be inefficient, thereby consuming relatively higher amounts of computing resources, such as CPU or memory. Furthermore, if the changes to the source code are relatively minor, executing the CI pipeline may unnecessarily occupy computing resources that can facilitate other computing processes.

Some examples of the present disclosure can overcome one or more of the issues mentioned above by executing the CI pipeline based on a type of content of the changes to the source code. By first identifying the type of content of the changes to the source code, a computing device can determine whether to execute the CI pipeline. For example, the changes to the source code can be associated with a prevention of an execution of the CI pipeline. Alternatively, the changes to the source code may be unassociated with the prevention of the execution of the CI pipeline. In such examples, the changes to the source code may correspond to changes for which the execution of the CI pipeline is to occur prior to deploying the changes to the source code. Based on whether the changes to the source code are associated with the prevention of the execution of the CI pipeline, the computing device can perform an action associated with the changes to the source code.

Selectively executing the CI pipeline can conserve the computing resources or enable allocation of the computing resources to the other computing processes. Furthermore, the developer can be more inclined to make relatively minor changes (e.g., fixing a typographical error) to the source code if the computing resources can be conserved. For example, the developer may edit the source code to improve readability if the developer is unconcerned with wasting the computing resources by executing the CI pipeline.

In one particular example, the computing device can receive a change to source code of a software application after a developer submits a request to a client device to implement the change to the source code. The change to the source code can include adding a comment, changing a variable name, or other suitable changes to the source code. The client device can include software development program with an analysis system that enables the software development program to determine an action to take with respect to the change to the source code.

To avoid unnecessarily running the CI pipeline, the computing device can identify the type of content associated with the change to the source code. For example, the computing device can output a binary indicator to indicate whether the type of content for the change to the source code is associated with preventing the execution of the CI pipeline. If the binary indicator indicates that the type of content is associated with the prevention of the execution of the CI pipeline, the computing device can prevent the execution of the CI pipeline before deploying the change to the source code. Instead of executing the CI pipeline to determine a suitability of the change to the source code for deployment, the computing device can tag the software application for review by a user. The user may include the developer or other suitable personnel authorized to access the source code for the software application.

Alternatively, if the binary indicator indicates that the type of content is unassociated with the prevention of the execution of the CI pipeline, the computing device execute the CI pipeline. Executing the CI pipeline can determine the suitability of the change to the source code for deployment, such as by ensuring compatibility with existing code in the software application or by detecting vulnerabilities in the change to the source code. After executing the CI pipeline, the computing device can deploy the change to the source code. The computing device may additionally or alternatively tag the software application so that the user can review the change to the source code prior to deploying the change to the source code.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is a block diagram of an example of a computing environment 100 for executing a CI pipeline 102 based on a type of content 104 of a change 106 to source code 108 according to one example of the present disclosure. Components within the computing environment 100 may be communicatively coupled via a network 110, such as a local area network (LAN), wide area network (WAN), the Internet, or any combination thereof. For example, the computing environment 100 can include a computing device 112 and a rule database 128 that are communicatively coupled through the network 110. Examples of the computing device 112 can include a desktop computer, laptop computer, server, mobile phone, or tablet. The computing device 112 can include a software development program with an analysis system to determine whether to execute the CI pipeline 102 based on the type of content 104.

A user 116 (e.g., a developer or a client) can interact with the computing device 112 to update the source code 108 of a software application 118. The software application 118 may, but need not be, part of a container in the computing environment 100. The computing device 112 may receive a request 120 to implement the change 106 to the source code 108 for the software application 118. The computing device 112 may receive the request 120 in response to the user 116 editing or updating the source code 108. Examples of the change 106 to the source code 108 can include editing a readme file, changing a variable name, or adding or editing a comment. Additional examples of the change 106 to the source code 108 can include adding or removing lines of code or adjusting a number of iterations for a loop.

The computing device 112 can identify the type of content 104 that is associated with the change 106 to determine whether the CI pipeline 102 is to be executed for the change 106. A first content type 122a may be associated with preventing an execution of the CI pipeline 102 for the change 106, and a second content type 122b may be associated with executing the CI pipeline 102 for the change 106. In some cases, the change 106 to the source code 108 may be relatively minor, such as fixing a typographical error in one or more lines of code or adding a comment in the source code 108. In such cases, the computing device 112 can determine the type of content 104 for the change 106 is the first content type 122a that is associated with preventing the execution of the CI pipeline 102. As such, the computing device 112 can bypass the CI pipeline 102 for the change 106 since executing the CI pipeline 102 to validate such a change may waste limited computing resources or occupy computing resources that other computing processes may use.

In some examples, to determine the type of content 104 associated with the change 106, the computing device 112 can apply a rule set 124. For example, the rule set 124 can associate the first content type 122a with preventing the execution of the CI pipeline 102 and the second content type 122b with executing the CI pipeline 102. In some examples, the computing device 112 can select the rule set 124 from rule sets 126 stored in a rule database 128. The rule database 128 may be local to or remote from the computing device 112. For example, the rule database 128 can be a part of the analysis program of the software development program in the computing device 112. The computing device 112 can select a rule set 124 from the rule sets 126 based on the change 106 to the source code 108, the source code 108, or a combination thereof. In some examples, the computing device 112 may use an identifier (e.g., a file type) of the source code 108 to select the rule set 124 from the rule sets 126. For example, if a file for the source code 108 has a file extension of .py, the computing device 112 can use the file extension to identify Python as the programming language of the source code 108. After identifying the programming language of the source code 108, the computing device 112 can select the rule set 124 corresponding to the programming language from the rule sets 126 in the rule database 128.

In some examples, the user 116 can generate at least one rule set of the rule sets 126 in the rule database 128. Accordingly, the user 116 can customize at least a part of the rule sets 126 to correspond specifically to typical changes to the source code 108 that are implemented by the user 116. For example, the user 116 may generate a specific rule set to prevent the execution of the CI pipeline 102 for a certain change to the source code 108 that is specific to a project managed by the user 116. As another example, if the user 116 typically writes the source code 108 using a specific programming language, the user 116 can generate a corresponding rule set that is specific to the specific programming language. Additionally or alternatively, a machine-learning model may be trained to generate a rule set to identify the type of content 104 of the change 106 to the source code 108. For example, the identifier of the source code 108 can be an input, and the machine-learning model can output the rule set 124 used to identify the type of content 104 of the change 106.

Applying the rule set 124 can involve identifying the type of content 104 by scanning at least a part of the source code 108 based on the rule set 124. For example, if the rule set 124 includes detecting a changed variable name, then applying the rule set 124 can involve scanning the change 106 to the source code 108 and existing code in the source code 108 to identify the changed variable name. If the changed variable name is identified, the type of content 104 for the change 106 can be determined to be the first content type 122a, which is associated with the prevention of the execution of the CI pipeline 102.

Based on the type of the content 104, the computing device 112 can determine an action 130 to implement for the change 106 to the source code 108. Examples of the action 130 can include executing the CI pipeline 102 or preventing an execution of the CI pipeline 102. For example, if the type of content 104 for the change 106 to the source code 108 involves the first content type 122a, the computing device 112 may prevent the execution of the CI pipeline 102 as the action 130. Examples of the change 106 to the source code 108 being the first content type 122a can include a change to a variable name or an adjustment to line spacing to improve readability. Generally, if the change 106 to the source code 108 is associated with a formatting change, the change 106 can be associated with the first content type 122a such that the computing device 112 prevents the execution of the CI pipeline 102.

The computing device 112 can output a notification 132 to the user 116 (e.g., via a display of the computing device 112 or to a user device of the user 116) to inform the user 116 about which rule set of the rule sets 126 caused the computing device 112 to avoid executing the CI pipeline 102. For example, the notification 132 can identify a rule definition 134 of the rule set 124 used to identify the type of content 104 for the change 106 to the source code 108 as being the first content type 122a. Based on the notification 132, the user 116 may review the change 106 to the source code 108 to ensure that the action 130 is suitable with respect to the change 106. In some examples, the user 116 may manually initiate the CI pipeline 102 to validate the change 106 to the source code 108 after reviewing the change 106 to ensure suitability for deployment.

If the type of content 104 is the second content type 122b, which is associated with executing the CI pipeline 102, the computing device 112 can execute the CI pipeline 102 to determine suitability of the change 106 to the source code 108 for deployment. Examples of the change 106 to the source code 108 being the second content type 122b can include a substantive change such as adding or removing lines of code. Executing the CI pipeline 102 may include running a vulnerability detector to determine whether at least one vulnerability or bug exists in the change 106. Additional examples of tools included in the CI pipeline 102 can include code compilation, unit tests, code analysis, or security (e.g., encryption).

In any case, the computing device 112 may deploy the change 106 to the source code 108 after performing the action 130. For example, after executing the CI pipeline 102 for a change 106 of the second content type 122b, the computing device 112 can deploy the change 106 to the software application 118. Before deploying the change 106, the computing device 112 can tag the software application 118 or the change 106 to the source code 108 for review by the user 116. The user 116 can review the source code 108 for mistakes, incompatibility, or other issues prior to the computing device 112 deploying the change 106. As a result, the user 116 can control whether the change 106 to the source code 108 is deployed by the computing device 112. For example, the user 116 may determine that another change is to be implemented to the source code 108 before deploying the source code 108. In response, the user 116 may deny the deployment of the change 106 to the source code 108 until the other change is ready to be deployed. If the computing device 112 executes the CI pipeline 102 for the change 106, the computing device 112 may avoid requesting approval from the user 116 before deploying the change 106.

In some examples, the computing device 112 may receive a set of changes 136 to the source code 108. The set of changes 136 may include different associations for a respective type of content for each change in the set of changes 136. For example, at least one change of the set of changes 136 may have the first content type 122a and at least one other change of the set of changes 136 may have the second content type 122b. As a result, determining whether to execute the CI pipeline 102 may be difficult solely using the rule sets 126.

As an example, a first change in the set of changes 136 may have a different type of content compared to a second change in the set of changes 136. Accordingly, a first action for the first change can conflict with a second action for the second change. For example, the first action may involve executing the CI pipeline 102, whereas the second action may involve preventing the execution of the CI pipeline 102. In such examples, the computing device 112 may default to executing the CI pipeline 102 for the set of changes 136.

Additionally or alternatively, instead of relying on the rule sets 126 to determine whether to execute the CI pipeline 102, the computing device 112 can output the notification 132 to the user 116 in response to receiving the set of changes 136. After receiving the notification 132, the user 116 can use the notification 132 to determine whether to execute the CI pipeline 102 for the set of changes 136 to the source code 108. For example, if the user 116 determines that executing the CI pipeline 102 is unsuitable for the change 106, the user 116 can generate an indication 138 that is received by the computing device 112. Using the indication 138, the computing device 112 can prevent the execution of the CI pipeline 102.

While FIG. 1 depicts a specific arrangement of components, other examples can include more components, fewer components, different components, or a different arrangement of the components shown in FIG. 1. For instance, in other examples, the rule database 128 may be located inside the computing device 112. Additionally, any component or combination of components depicted in FIG. 1 can be used to implement the process(es) described herein.

Figure 2:
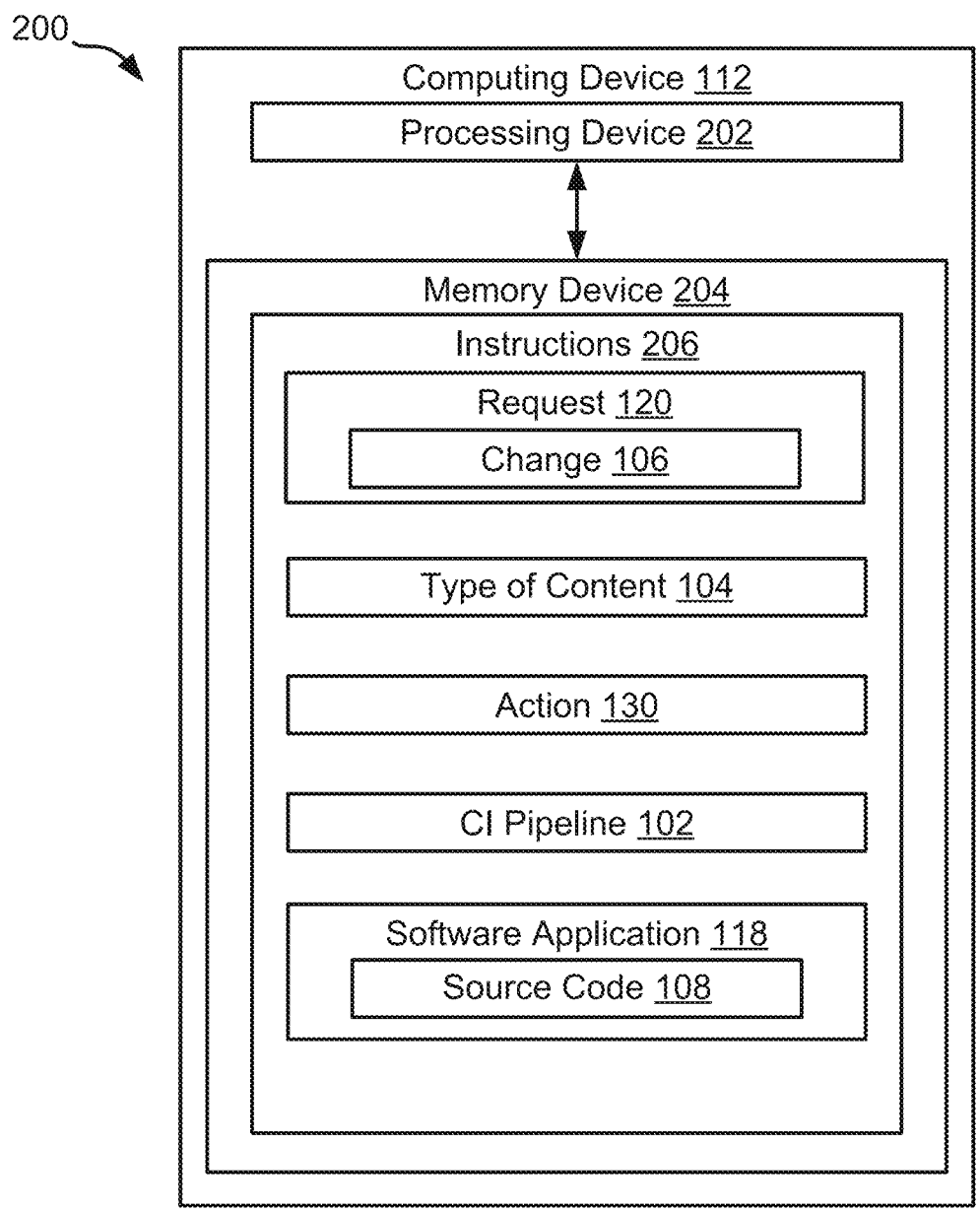
FIG. 2 is a block diagram of another example of a computing environment for executing a continuous integration pipeline based on a type of content for a change to source code according to one example of the present disclosure.

FIG. 2 is a block diagram of another example of a computing environment 200 for executing a CI pipeline 102 based on a type of content 104 of a change 106 to source code 108 according to one example of the present disclosure. The computing environment 200 can include a processing device 202 communicatively coupled to a memory device 204. The CI pipeline 102 can include a process for delivering an updated version of a software application 118 by automating steps associated with software development. In some examples, the computing environment 200 can execute the CI pipeline 102 to validate the change 106 to the source code 108, for example to ensure compatibility with existing code in the software application 118.

The processing device 202 can include one processing device or multiple processing devices. The processing device 202 can be referred to as a processor. Non-limiting examples of the processing device 202 include a Field-Programmable Gate Array (FPGA), an application-specific integrated circuit (ASIC), and a microprocessor. The processing device 202 can execute instructions 206 stored in the memory device 204 to perform operations. In some examples, the instructions 206 can include processor-specific instructions generated by a compiler or an interpreter from code written in any suitable computer-programming language, such as C, C++, C#, Java, Python, or any combination of these.

The memory device 204 can include one memory device or multiple memory devices. The memory device 204 can be non-volatile and may include any type of memory device that retains stored information when powered off. Non-limiting examples of the memory device 204 include electrically erasable and programmable read-only memory (EE-PROM), flash memory, or any other type of non-volatile memory. At least some of the memory device 204 includes a non-transitory computer-readable medium from which the processing device 202 can read instructions 206. A computer-readable medium can include electronic, optical, magnetic, or other storage devices capable of providing the processing device 202 with the instructions 206 or other program code. Non-limiting examples of a computer-readable medium include magnetic disk(s), memory chip(s), ROM, random-access memory (RAM), an ASIC, a configured processor, and optical storage.

In some examples, the processing device 202 can receive a change 106 to source code 108 of a software application 118 in response to a request 120 for changing the source code 108. For example, after receiving the request 120 generated by a user (e.g., the user 116 of FIG. 1), the processing device 202 can identify the change 106 to the source code 108 using the request 120. Additionally, the processing device 202 can identify a type of content 104 included in the change 106 to the source code 108. The processing device 202 can then determine whether the type of content 104 is associated with a prevention of an execution of the CI pipeline 102. For example, the type of content 104 may be a first content type that is associated with preventing the execution of the CI pipeline 102 or a second content type that is unassociated with preventing the execution of the CI pipeline 102.

In response to determining whether the type of content 104 is associated with the prevention of the CI pipeline 102, the processing device 202 can perform an action 130 associated with the change 106 to the source code 108 prior to a deployment of the change to the source code 108. For example, the action 130 can include executing the CI pipeline 102 or preventing the execution of the CI pipeline 102. By selectively executing the CI pipeline 102 based on the type of content 104, the processing device 202 can prevent unnecessary consumption of computing resources used to validate the change 106 to the source code 108. For example, if the change 106 involves adding a helper function to the source code 108, executing the CI pipeline 102 to validate the change 106 may be beneficial, such as to ensure compatibility with existing code in the source code 108. Alternatively, if the change 106 involves correcting a typographical error in a comment, the processing device 202 may avoid executing the CI pipeline 102, enabling relatively greater availability of computing resources for other computing processes. Examples of the typographical error can include misspellings or grammatical errors.

Figure 3:
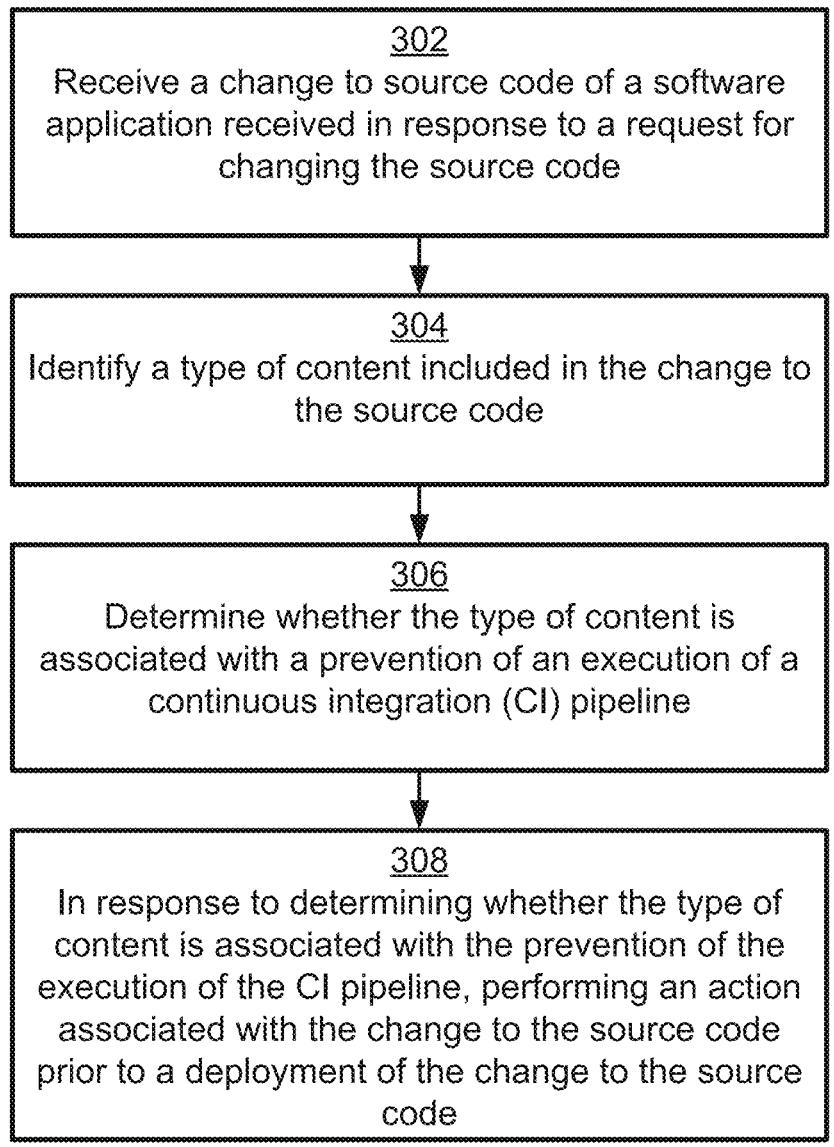
FIG. 3 is a flowchart of a process for executing a continuous integration pipeline based on a type of content for a change to source code according to one example of the present disclosure.

FIG. 3 is a flowchart of a process 300 for executing a CI pipeline 102 based on type of content 104 for a change 106 to source code 108 according to one example of the present disclosure. In some examples, the processing device 202 can perform one or more of the steps shown in FIG. 3. In other examples, the processing device 202 can implement more steps, fewer steps, different steps, or a different order of the steps depicted in FIG. 3. The steps of FIG. 3 are described below with reference to components discussed above in FIGS. 1-2.

In block 302, the processing device 202 receives a change 106 to source code 108 of a software application 118 in response to a request 120 for changing the source code being generated. The request 120 can be input by a user 116 (e.g., a developer working on the software application 118) to implement the change 106 to the source code 108 in the software application 118. In some examples, a container in the computing environment 100 may host the software application 118. After receiving the change 106, the processing device 202 can determine whether the CI pipeline 102 is to be executed. In some examples, the processing device 202 may receive a set of changes 136 to the source code 108 in the request 120 generated by the user 116. The set of changes 136 can include more than one change to the source code 108. For example, the user 116 may add a comment to the source code 108 in addition to fixing a typographical error in a variable name.

In block 304, the processing device 202 identifies the type of content 104 included in the change 106 to the source code 108. The processing device 202 can use a programming language associated with the change 106 to the source code 108 to determine the type of content 104 associated with the change 106 to the source code 108. For example, the processing device 202 can implement a rule set 124 from a rule database 128 that indicates whether the change 106 to the source code 108 is a comment based on the programming language. If the programming language is Python, a hashtag symbol can denote a start of a comment. Accordingly, the processing device 202 can search the change 106 to the source code 108 to determine whether the hashtag symbol is present, enabling the processing device 202 to then determine the type of content 104 for the change 106.

In block 306, the processing device 202 determines whether the type of content 104 is associated with a prevention of an execution of the CI pipeline 102. For example, the type of content 104 can be a first content type 122a or a second content type 122b. The first content type 122a can be associated with preventing the execution of the CI pipeline 102, whereas the second content type 122b can be associated with executing the CI pipeline 102. In some examples, the processing device 202 can determine the type of content 104 for the change 106 to the source code 108 using the rule set 124. The processing device 202 can access the rule database 128 that stores a plurality of rule sets 126 pertaining to determining the type of content 104 for the change 106 to the source code 108. The processing device 202 can select the rule set 124 from the rule sets 126 in the rule database 128 based on an identifying characteristic of the change 106 to the source code 108. Additionally or alternatively, the user 116 associated with the change 106 may generate a subset of the rule sets 126 that can be stored in the rule database 128 with an identifier linking the user 116 to the subset of the rule sets 126. The processing device 202 can use the subset of the rule sets 126 to determine the association of the type of content 104 for the change 106 after using the identifier to identify that the subset of the rule sets 126 matches with the user 116.

Examples of the identifying characteristic can include the programming language, the user 116 associated with the change 106 or the source code 108, or a combination thereof. Based on the identifying characteristic of the change 106, the type of content 104 may differ. For example, if the change 106 involves adjusting indentation for source code 108 written in C++, the processing device 202 may identify the change 106 as the first content type 122a. In response, the processing device 202 can prevent executing the CI pipeline 102 to avoid wasting computing resources. But, adjusting the indentation for source code 108 written in Python can cause the processing device 202 to identify the change 106 as the second content type 122b because of syntax rules associated with Python. As a result, the processing device 202 may execute the CI pipeline 102.

If the processing device 202 received the set of changes 136 to the source code 108, the processing device 202 can determine the type of content 104 for each change in the set of changes 136. In some examples, the type of content 104 for a first change in the set of changes 136 may conflict with a second change in the set of changes 136. For example, the first change may involve adding a comment to the source code 108, whereas the second change may involve changing a number of iterations for a loop in the source code 108. The first change can be associated with the first content type 122a, while the second change may be associated with the second content type 122b.

In block 308, in response to determining whether the type of content 104 is associated with the prevention of the execution of the CI pipeline 102, the processing device 202 performs an action 130 associated with the change 106 to the source code 108. The processing device 202 can perform the action 130 prior to a deployment of the change 106 to the source code 108. If the change 106 is associated with the first content type 122a, the action 130 can include preventing the execution of the CI pipeline 102 prior to the deployment of the change 106 to the source code 108. Alternatively, if the change 106 is associated with the second content type 122b, the processing device 202 may perform the action 130 by executing the CI pipeline 102.

In some examples, the action 130 can include outputting a notification 132. If the type of content 104 conflicts for the set of changes 136 received by the processing device 202, the processing device 202 can transmit the notification 132 to the user 116 such that the user 116 can determine whether to execute the CI pipeline 102. For example, the user 116 may decide to execute the CI pipeline 102 to ensure compatibility of the set of changes 136 with existing code in the source code 108. Additionally or alternatively, the processing device 202 may output the notification 132 to the user 116 to indicate at least one rule definition 134 of the rule set 124 being used to identify the type of content 104 for the change 106 or the set of changes 136 to the source code 108. The user 116 can use the rule definition 134 from the notification 132 to check that the type of content 104 identified by the processing device 202 is accurate prior to enabling the processing device 202 to apply the action 130. In some examples, if the user 116 disapproves the action 130 selected by the processing device 202 based on the notification 132, the user 116 can generate an indication 138 that is used by the processing device 202 to apply an alternative action. For example, if the processing device 202 is to prevent the execution of the CI pipeline 102 based on the type of content 104, the processing device 202 may execute the CI pipeline 102 in response to receiving the indication 138 from the user 116.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A non-transitory computer-readable medium comprising instructions that are executable by a processing device for causing the processing device to perform operations comprising:
    receiving a change to source code of a software application, the change to the source code being received in response to a request for changing the source code being generated;
    identifying a type of content included in the change to the source code by applying a rule set selected based at least on a programming language of the source code, the rule set configured for determining the type of content based at least on a syntax rule of the programming language, wherein the type of content comprises a first type of content unrelated to modifying a functionality of the source code and a second type of content related to modifying the functionality of the source code;
    determining, by applying the rule set, whether the type of content is associated with a prevention of an execution of a continuous integration (CI) pipeline, the first type of content corresponding to the prevention of the execution of the CI pipeline and the second type of content corresponding to the execution of the CI pipeline; and
    in response to determining whether the type of content is associated with the prevention of the execution of the CI pipeline, performing an action associated with the change to the source code prior to a deployment of the change to the source code.

2. The non-transitory computer-readable medium of claim 1, wherein the operations further comprise:
    in response to identifying the type of content as being associated with the prevention of the execution of the CI pipeline, preventing the execution of the CI pipeline with respect to the change to the source code, wherein identifying the type of content is based on the rule set associating a plurality of types of content with the prevention of the execution of the CI pipeline, wherein the plurality of types of content comprises the first type of content; and
    tagging the software application including the change to the source code for review by a user.

3. The non-transitory computer-readable medium of claim 2, wherein the operations further comprise:
    outputting a notification to the user, wherein the notification identifies a rule definition of the rule set being used to identify the type of content for the change to the source code as being associated with the prevention of the execution of the CI pipeline.

4. The non-transitory computer-readable medium of claim 1, wherein the operations further comprise, prior to identifying the type of content for the change to the source code:
    selecting the rule set from a rule database that includes a plurality of rule sets, wherein the plurality of rule sets is generated at least in part by a user.

5. The non-transitory computer-readable medium of claim 1, wherein the operations further comprise:
    in response to identifying the type of content as being unassociated with the prevention of the execution of the CI pipeline, executing the CI pipeline to test the change to the source code with respect to suitability for the deployment; and
    subsequent to executing the CI pipeline, deploying the change to the software application.

6. The non-transitory computer-readable medium of claim 1, wherein the operations further comprise:
    receiving a set of changes to the source code in response to the request being generated, wherein the set of changes to the source code comprises:
        a first change to the source code associated with the prevention of the execution of the pipeline, wherein the first change corresponds to the first type of content; and
        a second change to the source code unassociated with the prevention of the execution of the pipeline, wherein the second change corresponds to the second type of content; and
    in response to receiving the set of changes to the source code, executing the CI pipeline to test the set of changes to the source code with respect to suitability for the deployment.

7. The non-transitory computer-readable medium of claim 6, wherein the operations further comprise, in response to receiving the set of changes to the source code:
    outputting a notification to a user prior to executing the CI pipeline, wherein the notification identifies a conflict in a respective type of content of the first change and the second change to the source code; and
    receiving an indication from the user that prevents the execution of the CI pipeline for the set of changes to the source code based on the notification.

8. A computer-implemented method comprising:
receiving a change to source code of a software application, the change to the source code being received in response to a request for changing the source code being generated;
identifying a type of content included in the change to the source code by applying a rule set selected based at least on a programming language of the source code, the rule set determining the type of content based at least on a syntax rule of the programming language, wherein the type of content comprises a first type of content unrelated to modifying a functionality of the source code and a second type of content related to modifying the functionality of the source code;
determining, by applying the rule set, whether the type of content is associated with a prevention of an execution of a continuous integration (CI) pipeline, the first type of content corresponding to the prevention of the execution of the CI pipeline and the second type of content corresponding to the execution of the CI pipeline; and
in response to determining whether the type of content is associated with the prevention of the execution of the CI pipeline, performing an action associated with the change to the source code prior to a deployment of the change to the source code.

9. The method of claim 8, further comprising:
in response to identifying the type of content as being associated with the prevention of the execution of the CI pipeline, preventing the execution of the CI pipeline with respect to the change to the source code, wherein identifying the type of content is based on the rule set associating a plurality of types of content with the prevention of the execution of the CI pipeline, wherein the plurality of types of content comprises the first type of content; and
tagging the software application including the change to the source code for review by a user.

10. The method of claim 9, further comprising:
outputting a notification to the user, wherein the notification identifies a rule definition of the rule set being used to identify the type of content for the change to the source code as being associated with the prevention of the execution of the CI pipeline.

11. The method of claim 8, further comprising, prior to identifying the type of content for the change to the source code:
selecting the rule set from a rule database that includes a plurality of rule sets, wherein the plurality of rule sets is generated at least in part by a user.

12. The method of claim 8, further comprising:
in response to identifying the type of content as being unassociated with the prevention of the execution of the CI pipeline, executing the CI pipeline to test the change to the source code with respect to suitability for the deployment; and
subsequent to executing the CI pipeline, deploying the change to the software application.

13. The method of claim 8, further comprising:
receiving a set of changes to the source code in response to the request being generated, wherein the set of changes to the source code comprises:
a first change to the source code associated with the prevention of the execution of the pipeline, wherein the first change corresponds to the first type of content; and
a second change to the source code unassociated with the prevention of the execution of the pipeline, wherein the second change corresponds to the second type of content; and
in response to receiving the set of changes to the source code, executing the CI pipeline to test the set of changes to the source code with respect to suitability for the deployment.

14. The method of claim 13, further comprising, in response to receiving the set of changes to the source code:
outputting a notification to a user prior to executing the CI pipeline, wherein the notification identifies a conflict in a respective type of content of the first change and the second change to the source code; and
receiving an indication from the user that prevents the execution of the CI pipeline for the set of changes to the source code based on the notification.

15. A system comprising:
a processing device; and
a memory device that includes instructions executable by the processing device for causing the processing device to perform operations comprising:
receiving a change to source code of a software application, the change to the source code being received in response to a request for changing the source code being generated;
identifying a type of content included in the change to the source code by applying a rule set selected based at least on a programming language of the source code, the rule set configured for determining the type of content based at least on a syntax rule of the programming language, wherein the type of content comprises a first type of content unrelated to modifying a functionality of the source code and a second type of content related to modifying the functionality of the source code;
determining, by applying the rule set, whether the type of content is associated with a prevention of an execution of a continuous integration (CI) pipeline, the first type of content corresponding to the prevention of the execution of the CI pipeline and the second type of content corresponding to the execution of the CI pipeline; and
in response to determining whether the type of content is associated with the prevention of the execution of the CI pipeline, performing an action associated with the change to the source code prior to a deployment of the change to the source code.

16. The system of claim 15, wherein the operations further comprise:
in response to identifying the type of content as being associated with the prevention of the execution of the CI pipeline, preventing the execution of the CI pipeline with respect to the change to the source code, wherein identifying the type of content is based on the rule set associating a plurality of types of content with the prevention of the execution of the CI pipeline, wherein the plurality of types of content comprises the first type of content; and
tagging the software application including the change to the source code for review by a user.

17. The system of claim 16, wherein the operations further comprise:
outputting a notification to the user, wherein the notification identifies a rule definition of the rule set being used to identify the type of content for the change to the source code as being associated with the prevention of the execution of the CI pipeline.

18. The system of claim 15, wherein the operations further comprise, prior to identifying the type of content for the change to the source code:

selecting the rule set from a rule database that includes a plurality of rule sets, wherein the plurality of rule sets is generated at least in part by a user.

19. The system of claim 15, wherein the operations further comprise:

in response to identifying the type of content as being unassociated with the prevention of the execution of the CI pipeline, executing the CI pipeline to test the change to the source code with respect to suitability for the deployment; and subsequent to executing the CI pipeline, deploying the change to the software application.

20. The system of claim 15, wherein the operations further comprise:

receiving a set of changes to the source code in response to the request being generated, wherein the set of changes to the source code comprises:

a first change to the source code associated with the prevention of the execution of the pipeline, wherein the first change corresponds to the first type of content; and a second change to the source code unassociated with the prevention of the execution of the pipeline, wherein the second change corresponds to the second type of content; and in response to receiving the set of changes to the source code, executing the CI pipeline to test the set of changes to the source code with respect to suitability for the deployment.

* * * * *